United States Patent [19]

Stevenson

[11] Patent Number: 5,498,307

[45] Date of Patent: Mar. 12, 1996

[54] IN-MOLD LABELING USING AN ADHESIVE

[76] Inventor: John D. Stevenson, 96 Charleston Park, Conroe, Tex. 77302

[21] Appl. No.: 298,381

[22] Filed: Aug. 30, 1994

[51] Int. Cl.⁶ .................................................. B29C 45/14
[52] U.S. Cl. .................. 156/277; 156/244.16; 264/311; 264/509; 264/265
[58] Field of Search .................................. 156/277, 242, 156/244.16; 264/132, 135, 311, 509, 265

[56] References Cited

U.S. PATENT DOCUMENTS

| | | | |
|---|---|---|---|
| 2,584,841 | 2/1952 | Caprez et al. | 264/265 X |
| 2,601,700 | 7/1952 | Pinsky et al. | |
| 2,855,631 | 10/1958 | Rowley | 264/211 |
| 3,079,644 | 3/1963 | Molitor et al. | 264/246 |
| 3,108,850 | 10/1963 | Brandt | 264/509 |
| 3,207,822 | 9/1965 | Makowski | 264/265 X |
| 3,420,729 | 1/1969 | Roberts | 428/35.7 |
| 3,492,391 | 1/1970 | Van Atten | 264/245 |
| 3,550,197 | 12/1970 | Szajna | |
| 3,796,622 | 3/1974 | Brody | 264/245 |
| 3,923,941 | 12/1975 | Weaver | 264/73 |
| 3,953,564 | 4/1976 | Weidman | 264/78 |
| 4,089,922 | 5/1978 | Saito et al. | 264/108 |
| 4,158,689 | 6/1979 | Pett et al. | 264/63 |
| 4,183,883 | 1/1980 | Blair | 264/40.1 |
| 4,213,926 | 7/1980 | Toyoda et al. | 264/74 |
| 4,252,762 | 2/1981 | Stevenson | 264/126 |
| 4,267,229 | 5/1981 | Knight et al. | 428/324 |
| 4,318,683 | 3/1982 | Fishbaugh et al. | 425/429 |
| 4,519,972 | 5/1985 | Stevenson | 264/245 |
| 4,548,779 | 10/1985 | Steinberg et al. | 264/255 |
| 4,668,450 | 5/1987 | Blochl et al. | 264/25 |
| 4,826,713 | 5/1989 | Cook | 156/244.16 X |
| 4,880,588 | 11/1989 | Brault et al. | 264/163 |
| 4,895,690 | 1/1990 | LaRoche et al. | 264/245 |
| 5,060,943 | 10/1991 | Stoffo | 273/32 B |
| 5,073,325 | 12/1991 | Gray | 264/245 |
| 5,227,222 | 7/1993 | Ogawa et al. | 428/195 |
| 5,311,816 | 5/1994 | Schliessmann | 101/488 |
| 5,322,431 | 6/1994 | Kahlen et al. | 425/72.1 |
| 5,344,045 | 9/1994 | Richter et al. | 222/1 |
| 5,346,259 | 9/1994 | Mocilnikar et al. | 283/108 |
| 5,346,386 | 9/1994 | Albrecht et al. | 425/541 |
| 5,352,535 | 10/1994 | Su | 428/511 |
| 5,352,536 | 10/1994 | Akamatsu et al. | 428/552 |

FOREIGN PATENT DOCUMENTS

| | | | |
|---|---|---|---|
| 2730899 | 2/1979 | Germany | 156/244.16 |
| 50-28462 | 9/1975 | Japan | 264/259 |
| 0055842 | 4/1980 | Japan | 264/265 |
| 2275724 | 11/1987 | Japan | 264/259 |

OTHER PUBLICATIONS

Hochner, In-Mold Decoration, *Plastics World*, Feb. 1963, p. 24.

Primary Examiner—David A. Simmons
Assistant Examiner—Steven J. Helmer
Attorney, Agent, or Firm—Guy McClung

[57] ABSTRACT

Methods have been invented for molding parts and for embedding a decorative, instructional or identifying pattern into the surface of molded products during a molding process. In certain embodiments of this method, the pattern is formed as a pattern structure consisting of one or more shaped film elements or of many complementary shaped elements of various opaque, translucent, and/or transparent films. Inks, paints, overlays and inlays may be used on one or more of the films to further embellish the pattern structure. The pattern structure is then applied to the inner surface of a molding mold. In a rotomolding process according this invention, the mold is charged with casting resin, heated and rotated. The pattern structure is molded into and becomes an integral part of the product.

4 Claims, 2 Drawing Sheets

IN-MOLD LABELING USING AN ADHESIVE

BACKGROUND OF THE INVENTION

1. Field of the Invention

This invention relates to molding methods, to rotomolding methods, to blow molding methods, and in one aspect to methods for imparting decorative and printed matter to molded parts which become an integral member of the molded part.

2. Description of Related Art

In certain prior art rotational molding methods, molded parts are formed within a mold cavity by charging the cavity with particulate molding resin, then heating the cavity to a molding temperature while rotating or tumbling the mold, usually in two or more axes, for a sufficient time to disperse the molten resin particles into a molten film which coats the interior walls of the cavity. Thereafter the mold is cooled until the rotomolded part has solidified, then it is opened and the part is removed from the mold. One disadvantage of this molding technique is that it is difficult and/or ineffective to apply decorative or printed matter to the molded part after it is molded. This is aggravated by use of conventional molding resins, e.g., polyolefins, etc., which form surfaces that are not readily receptive to coatings of paints, inks, decals, and the like. Some attempts have been made to chemically or physically treat the surfaces of rotomolded products, e.g., by flame treatment, to render the surfaces receptive to printing inks. These procedures are costly and the resulting patterns are sensitive to abrasion.

U.S. Pat. Nos. 4,252,762 and 4,519,972 proposed a system in which patterns are formed on a transfer film, then subsequently transferred from the transfer film to an inner surface of a mold. In this process pigments in the molten pattern migrate into the molding resin as it coalesces during the molding process. Although a pattern is formed as part of the molded product, this process has shortcomings: pattern sizes are limited due to mechanical restrictions in screen printing; long patterns must be pieced from several screen-printed sheets; color and pattern matching is difficult; the transfer of the pattern from the carrier onto the inner mold surface is difficult, costly, and time consuming; burnishing is required to transfer the pattern from the carrier film to the mold; this burnishing is not only troublesome but also may injure the mold surface, requiring frequent mold refinishing; errors in burnishing of the pattern may be costly; if a fragment of the pattern is not burnished properly, it will not transfer, leaving a hole in the transferred pattern; if the defect is not noticed, a defective molded part is produced; if it is noticed, the removal of the old pattern prior to replacing it with a new one is difficult and can result in a damaged mold requiring extensive rework; the transfer patterns are very thin and fragile and their adherence to the carrier film is, by design, precarious since they must release easily from the transfer carrier when transferred to the mold; cracking due to brittleness of the pattern is common; fractures of the pattern during application are common; shipping damage is common; weather temperature extremes can render the patterns useless; the transfer pattern melts at a lower temperature than does the particulate resin used to mold the part; it will not transfer from the transfer film to the mold wall properly if the mold is too hot; if the molded part is removed from the mold while the mold temperature is too high for pattern transfer, then a delay period of time must be introduced to provide a mold cooling period; such delay adds to the mold cycle time thereby increasing molding costs; the transfer pattern becomes molten during the early portion of the molding cycle, prior to the melting of the resin particles; the mold charge is typically in the form of pellets and if allowed to flow over the image too long, erodes the pattern away, resulting in a ruined molded part; in order to avoid this damage, the mold must be preheated before being agitated; this preheat stage adds further complication and cost to the mold cycle; the transfer pattern leaves a faint 'ghost' image on the surface of the mold after the molded part is removed from the mold; if the next application of a pattern to the mold is not in exactly the same location, this ghost image of the previous application will appear on the new part in addition to the proper pattern; the part is thus cosmetically defective; careful placing of the pattern is thus required to avoid this defect; the extra time and danger associated with this careful placement adds to the cost of the end product part; a transfer pattern cannot be moved in its location on the mold wall, once burnishing is started; if an error in location is noted, the entire burnished area must be removed, the transfer pattern discarded, and a new one located properly and burnished into position; transfer pattern removal can easily cause serious damage to the polished surface of the mold wall. These factors can disrupt the molding schedule drastically, adding further to the cost of the molded end product part.

The mold cavity used in a typical blow molding process usually does not subject the graphic to as severe an environment as does a typical rotomolding process. In blow molding the mold is fixed in position during operation, as opposed to the rotomolding process in which a mold is rotated constantly through at least two axes throughout the mold cycle. Also, in blow molding a much narrower range of temperatures is used. It is customary in the blow molding industry to use vacuum to hold a graphic in place during a mold cycle. The mold is drilled through for the application of the vacuum. The graphic is placed into position on the inner face of the mold and the vacuum is applied to hold the graphic in place throughout the mold cycle. In blow molding, the heating is done on the tubular film suspended within the mold, as opposed to heating the mold in the case of rotomolding. The heated film is then blown against the mold while it is soft. The mold is kept cool enough to cool the film when the film contacts it, thus freezing the film in its new conformation. Rotation of a rotomolded mold in two axes makes it difficult to design and build a mechanism which allows the use of vacuum to hold a graphic in place during a molding cycle. In addition, the use of vacuum as an in-mold graphic holding device in rotomolding has other drawbacks: since the graphic approaches its molten state during the mold cycle, it tends to leak into vacuum inlet holes in the mold, resulting in a molded part being stuck to the mold at the completion of the molding cycle and in disfigurement of the molded part surface over the area of applied vacuum—an unsightly bump would appear on the surface of the molded part, corresponding with each vacuum inlet hole. Many adhesives cannot be used since one strong enough to hold the graphic in place during the rigors of the mold cycle would also inhibit release of the finished part when the mold cycle is completed. Other adhesives, especially those which contain volatile solvents, generate gas bubbles in the mold-graphic interface and contribute to weakened and ugly walls in a molded part.

Various areas of difficulty are encountered in the use of adhesive systems:

—The end location of the graphic on the surface of the finished part should be consistent from one molded part to the next;

—The placement of the graphic on the inner surface of the mold must also be consistent and the molder should be able to get the same end result with each graphic placement;

—The graphic should not come loose from the mold during the molding process, either as the result of the tumbling process, the heating and cooling cycle, or the abrasion of the particulate resin during the tumbling; and if the graphic curls or tumbles during a rotomolding process, the molded part will be cosmetically ruined;

—The system used for attaching the graphic to the inner surface of the mold should not allow any trapped air between the two;

—The adhesive used should cease its function at the end of the molding cycle so that the molded part can be easily removed from the mold; and —Although the graphic should remain in the same location on the inner surface of the mold throughout a rotomolding cycle, it should nevertheless be allowed the freedom to grow and shrink along that surface as the mold temperature changes; since the graphic does not have the same coefficient of expansion with heat as the mold, it elongates more than the mold as the temperature rises, then shrinks more as the temperature falls. As the mold heats up, the graphic should be allowed to grow on the mold surface, otherwise the stress introduced by expansion will cause the graphic to buckle at right angles to the direction of expansion, leaving an unsightly and wall-weakening defect in the molded part wall.

Graphics which are mounted on a transfer sheet, and which are subsequently burnished from the transfer sheet onto a rotomolding mold surface, are limited to two dimensional displays and may only be applied on plane surfaces (i.e. curvature allowed only in one of the two dimensions). There is a need in the industry for in-mold graphics which can be fitted to more complex mold inner surfaces. An example of such a need is the tail-light assembly in a rotomolded toy automobile in which the graphic must conform to a shape which wraps around the rear corner of the automobile with curvature in at least two dimensions. Unlike prior art transfer graphics, certain film graphics described herein which are composed of only thermoplastic materials, may be further thermo-formed into a replica of the mold inner surface, using standard prior art industry thermoforming practice, thus forming a mold fitting part when installed in the mold. Such an application of in-mold graphics has not been heretofore available.

The following U.S. Patents describe various molding methods and techniques: U.S. Pat. Nos. 3,079,644; 3,420,729; 3,492,391; 3,796,622; 3,953,564; 4,089,922; 4,183,883; 4,267,229; 4,318,683; 4,548,779; 4,668,450; 4,880,588; 4,895,690; 5,073,325; and 5,311,816.

SUMMARY OF THE PRESENT INVENTION

This invention, in one embodiment, discloses a method for producing molded parts and a method for providing decorative or printed objects or patterns in the surface of molded products which eliminate or reduce the effects of the problems associated with prior methods while providing many new, unique, nonobvious improvements to the arts of part production, molding, and decoration.

In one embodiment a three step process is disclosed which includes: making a film from material, e.g. plastic, paper, foil, or synthetic paper construction of a pattern structure; applying the pattern structure to the inner wall surface of a mold; and then molding the product. The pattern structure, preferably, becomes an integral part of the product; e.g., when the materials of the various film(s) layers and/or indicia are heated the materials flow together and then upon cooling fuse together forming an integral item. When a part to be formed is also made from the same material, e.g. all components made from polyethylene, then an integral part is formed with the pattern structure as an integral portion of the part.

In constructing a pattern structure according to certain embodiments of the present invention, this film is, preferably a material which bonds to resin used in molding the end product or part during the molding cycle. The film may be made of the same material as that used to cast the molded part, i.e. polyethylene film in the case of products which are molded from polyethylene resin. The shaping of the film may be accomplished by hand, i.e. with scissors or knife, by die-cutting, or by a numerically controlled cutting machine. Film thickness is determined by the artistic effect desired. In certain embodiments the film thicknesses ranges between about 0.002 inch to about 0.010 inch. The film from which these primary pattern elements are constructed may be clear or of any opaque or translucent color or combination thereof. Certain pattern structures include an indicia layer which is a single shaped film primary pattern element such as an alphanumeric character, logo or decorative stripe.

Primary pattern elements may be further embellished by decoration with indicia formed of inks, paints, overlays, and inlays. Standard graphic processes such as offset printing, hot-stamp, screen-print, etc. may be employed to apply such decorations to the primary pattern elements. The indicia in one aspect are made from the same plastic material as the lower and upper layers of the pattern structure.

More complex pattern structures are constructed according to certain embodiments of this invention by combining two or more of the primary pattern elements; e.g., product names with various letters combined to form the name, all placed on another primary pattern element used to control the spacing and provide the background. Multi-colored pattern structures, such as logos, are constructed from primary pattern elements shaped to be fitted into the pattern structures. Unusual artistic effects are provided by overlaying translucent primary pattern elements over other opaque or translucent primary pattern elements.

Other primary pattern elements are used in certain embodiments of the present invention in the pattern structure for mechanical purposes. A clear film is used for convenience as a platform for the assembly of a pattern structure. Areas of this clear layer not covered by opaque elements assembled thereon allow the base color of the molded part to show. A clear film is added to the pattern structure, in certain embodiments, on the side to be placed against the wall of the mold, to act as a wear buffer to protect the image on the molded part from an abrasive environment.

The pattern structure is applied, in certain embodiments, to a selected location on the inner wall of a mold to be used in molding the desired end product or part. It is applied before the mold is charged with the resin for the next molded part to be produced. An adhesive may be used to hold the pattern structure in place during the molding cycle. A firm plastic roller or squeegee may be rolled over the back of the pattern structure to insure an airtight fit between the mold and the pattern structure.

An adhesive used in attaching the pattern structure to the mold is preferably free of components which will out-gas during the mold cycle. Vegetable oils may be used for this purpose. A preferred adhesive is formulated from micronized plastic suspended in an oil or wax to form a thick paste or gel which is worked in such a manner to remove entrapped air bubbles. Micronized plastic is plastic in the form of pellets which are very small, in the range of about 10 to about 100 microns in size (largest dimension). An adhesive made from micronized plastic and vegetable oil, for example, has indefinite shelf life at room temperatures but permanently bonds at mold temperatures. The micronized plastic is, preferably, compatible with the material to be used in molding the part, i.e. a micronized polyethylene is, preferably, used when molding polyethylene parts. During the molding process, the micronized plastic becomes molten also and becomes a part of the part.

One of the ways to evacuate the air from between the graphic and a rotomold mold inner surface and to create a vacuum seal between a film and a mold surface is to coat both heavily with oil, place them together, then use a roller or squeegee to evacuate as much of the oil as possible from between them. As the oil is evacuated it carries any air bubbles with it. If the graphic is thus sealed to the inner surface of the mold, and the seal along the edge does not allow air to leak into the sealed area, the graphic stays in place due to air pressure on its outer surface. If the oil is thin, however, and there are imperfections in the graphic surface or stresses in the graphic film itself which tend to cause surface distortion during the temperature changes of the mold cycle, it will be unable to hold the seal and the graphic will distort, work loose, or develop air pock marks on its surface. This effect is further intensified by the heating portion of the mold cycle, since the viscosity of the oil decreases greatly. Also, oils used are of a type which contains no portions which will boil during the extremes of the mold heat, otherwise a gas is created which causes the very defect which it is used to avoid viscous oils with high boiling temperatures are often used. A number of oils may be used for this purpose. A vegetable oil such as Canola or cotton-seed works well, though not as high in viscosity as other oils.

Many additives may be used to thicken the oil, but most leave undesirable residues on the surface of a molded part. One method of increasing oil viscosity, and one which appears to have no deleterious side effects, is to form a polyethylene gel in the oil. (Polyethylene gels are known as a means of introducing microfine polyethylene particles into paints, waxes and inks to gain certain desirable characteristics.) The viscosity may be increased to any desired point and the residue (the polyethylene dispersed in the oil) ultimately melts and becomes a part of the rotomolded part. The use of an oil/polyethylene gel as a means of evacuating the air from between a graphic structure and the wall of a mold and providing a vacuum seal which will hold the graphic structure in place, thus acting as an adhesive, is believed to be new, although such gels themselves are not new. One method of making such a gel is detailed below.

One gel useful with this invention is made from polyethylene as follows:

1. Melting polyethylene (any form may be used, such as granules, sheet, or remelt) in a solvent; in one embodiment it is preferred that the solvent be a vegetable oil such as cotton-seed oil; the preferred ratio by weight of the two ingredients is about one part polyethylene to about four parts oil; heating and stirring until the mixture is a completely liquid solution.

2. Removing the liquid solution from the heat and allowing it to cool to room temperature; the polyethylene precipitates in the oil and forms a gel; the thickness or viscosity of the gel is dependent on the ratio of polyethylene to oil, being thinner with additional oil; the thickness is also dependent on the rate of cooling of the heated solution; if a given solution is shock cooled (cooled suddenly) the particles which precipitate are smaller, causing the gel to be more viscous; in order to obtain the highest ratio by weight of polyethylene to oil in the final gel, (one preferred embodiment), the mixture is cooled slowly, i.e. from 325 degrees F. to room temperature over a period of about 30 minutes or longer.

3. The viscosity of the gel is preferably not adjusted by adding oil after the mixture is once cooled; additional solvent would break down the precipitated gel matrix; preferably the entire mixture is reheated and re-cooled with additional solvent or polyethylene to obtain a desired viscosity.

In one embodiment the gel adhesive is used as follows: the oil-polyethylene gel is applied to both the mold surface and to the face side of the graphic. The graphic is placed with its face against the inner surface of the mold. The gel is then worked out from between the graphic and the mold surface, using a squeegee or roller. The removal of excess gel also removes air, preferably substantially all of the air or all of the air. The viscosity of the gel causes an air tight seal along the edges of the graphic. As heat is applied to the mold, the viscosity of the gel diminishes. The graphic expands due to the heat. The oil in the gel lubricates the graphic and the mold surface, thus allowing the graphic to expand along the mold surface in all directions. Since the oil in the gel is also a solvent to the graphic film at elevated temperatures, the graphic begins to absorb the oil from the gel as the mold temperature rises. As the oil is absorbed from the gel, the gel becomes more viscous, thereby offsetting the reduction of the gel viscosity with heat, thus maintaining the air seal. When the mold reaches the melting temperature of both its resin and the graphic on its inner surface, the oil in the gel is almost completely absorbed into the graphic and the polyethylene in the gel melts and becomes a part of the surface of the graphic. The graphic is at its most elongated condition at this point, and since it is in a plastic state, has lost all or nearly all internal stresses thereby diminishing the need for the adhesive. As the cooling cycle begins, the gel has disappeared, and so it does not bond the molded part to the mold. As the molded part cools and contracts, the graphic cools and contracts at the same rate as the part. This contraction causes the molded part to separate from the mold surface.

Since the pattern structure in certain embodiments preferably has thermal properties similar to the material used in molding the part, no additional or special mold heating or cooling procedures are required to accommodate its application. If the mold is cool enough to remove the previous molded part, it is cool enough to apply the pattern structure for the next molded part. Since the pattern structure is inherently rugged, there is no need to preheat the mold before starting the molding process. Tumbling unmelted resin particles do not abrade the pattern structure. For the same reason, handling and storage costs are less than those associated with the handling and storage of fragile images on transfer paper. Since the portion of the pattern structure which is attached to the mold wall is a film, as opposed to an ink or pigment structure, formation of ghost images between parts as a result of changes in location is inhibited. The pattern structure need not be placed in exactly the same location each time. This lack of need for precision results in quicker work cycle time. If, however, it should be unacceptably located, the pattern structure may be peeled quickly from the mold wall and relocated, without danger of damage to the mold surface.

After the application of the pattern structure to the selected inner surface of the mold, in a rotomolding process according to this invention, the mold is charged with resin and agitated through two or more axes while being heated. After the resin is molten and covers the inner surface of the mold, the mold is cooled and the molded part removed. The pattern structure may then be viewed on the outer surface of the molded part.

Certain graphics (pattern structures) produced according to the present invention which have a clear film overlay not only provide a wear resistant graphic but also one which gains eye appeal from its apparent 'suspended in space' appearance. This effect may be augmented by providing a clear film layer beneath the graphic, making the graphic appear as if one could actually peer under it. Thickening the clear overlay and underlay films enhances this effect by providing more depth to the illusion in certain embodiments (e.g. thickening to produce a pattern structure of 0.1 inches thick or more.) Providing a further contrasting background film beneath the clear-graphic-clear combination adds further depth. More complex 3-D images may be constructed by assembling the graphic itself as several layers of alternately clear and color. With appropriate material selection and assembly, 3-D objects embedded in plastic may be added to the film assembly.

Thus in at least certain preferred embodiments of methods according to this invention a relatively thick tough protective overlay (one or more) is provided for a pattern, film, or 3-D object which is an integral part of a molded product or part which requires no mold modification, one heat cycle, and one cooling cycle, even when multiple color patterns, films, or 3-D objects are employed. Such patterns, films, or 3-D objects are preferably pre-prepared or pre-made and are ready for use as desired.

A method according to the present invention for applying patterns to the surfaces of cans or other containers includes fitting a tubular piece of shrinkable thermoplastic material over a can. The material has a desired pattern, design, etc. pre-printed thereon. The tubular piece can be blown out, e.g. with a puff of air, to facilitate fitting it around the can. In one aspect the can is pre-heated so that the heat shrinks the thermoplastic material onto the can. In another aspect a blast of hot air around the tubular material shrinks it to the can or, when used with a pre-heated can facilitates a tight emplacement of the tubular material. In certain preferred embodiments the pattern, design, etc. is pre-applied or pre-printed on the interior of the tubular stock so that the final product has a pattern etc. which is overlaid and protected by the thermoplastic material. In another preferred embodiment a roll of shrinkable thermoplastic is printed repetitively (reversed), one image for each can. The width of the roll is the circumference of the can plus an overlap sealing area. It is printed larger than final size, preferably about 10% larger. It is then coiled over and sealed to form a tube with the printing on the inside of the plastic tube. The can is pre-heated. The tubular stock is cut to length, blown open with a puff of air, and fitted down around the can. The heat of the can shrinks the tube into a permanent fit. A blast of hot air around the can ensures a tight fit. Preferably polyethylene film is used or another plastic such as vinyl.

The film in certain embodiments is transparent. Either screen printing or offset printing may be used to print on the film. Inks used are, preferably, disposed within the film and are protected from the public with a layer of clear plastic over them.

In another embodiment Teslin, a waterproof synthetic paper that can be offset printed in all colors, is used. No special inks are required and the paper is printed directly as a positive. The can graphics are printed on sheets of Teslin, properly sized to fit the can. Plastic film is extruded directly as a tube. The printed paper is wrapped around the can; a length of tubing is emplaced over the paper, and then shrunk for a permanent fit.

Such processes are useful for containers such as cans, glass bottles, and rigid plastic containers.

The present invention discloses methods for making wall coverings. Such methods include bonding a synthetic paper, such as Teslin, to a heated olefin film; (Teslin has several advantages over traditional paper: it is waterproof, it has no grain or lamination, it is uniformly porous for excellent printing "tooth"). An additional layer of adhesive is added to the other side of the paper using industry standard prior art roll film coating equipment. Most coating equipment makes use of rollers to transport the film, a vat to hold the adhesive, and a carefully spaced knife edge to obtain uniform coverage over the entire width of the film. Such coatings are thin, usually one to five mils in thickness. This adhesive may be similar to the popular wallpaper glue or may be tailored to fit the needs of the application, such as using pressure sensitive glues for ease in installation or a hot melt glue in which case the wallpaper is ironed on the wall with a heating tool (and removed the same way). A polyester cover is particularly rugged and most films made from vinyl, polyethylene, or polypropylene resist grime and graffiti, and are easy to clean. Polyester film may also be produced with matte finishes, if a gloss is not desirable. These wall coverings are of particular value in public restrooms, commercial wall coverings in halls or foyers, pre-installed on movable partitions, pre-installed on panels in the construction of mobile homes, etc. Designs may be printed directly to the back side of the clear film.

It is, therefore, an object of at least certain preferred embodiments of the present invention to provide:

New, useful, unique, efficient, nonobvious methods for molding products or parts with a pattern, film, or object;

Such methods for use in rotomolding or blow molding;

Such methods in which the pattern etc. becomes an integral part of the end product;

Such methods in which the pattern etc. has multiple colors; and

Such methods in which the end product has a pattern etc. with a tough protective layer over it.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
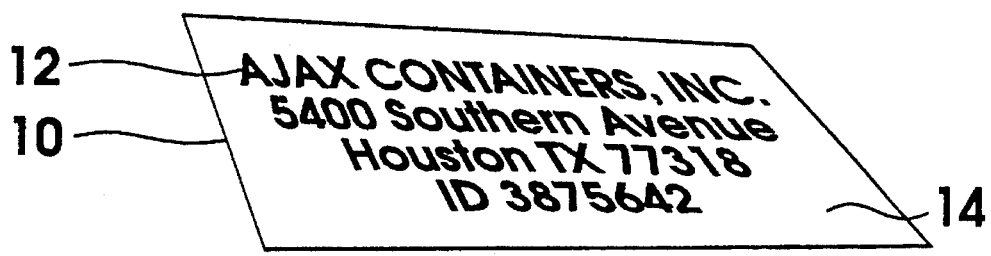
FIG. 1 is a schematic perspective view of a pattern structure according to the present invention.

Refer now to FIG. 1 which illustrates a pattern structure 10 according to the present invention which has a pattern 12 including many pattern elements which in this case are alphanumeric characters. The pattern 12 is on a background 14.

The methods by which the pattern 12 may be made or formed on the surface of the pattern background 14 include any known method or process for emplacing, printing, imprinting, embossing, painting or applying a pattern or indicia, including, but not limited to: lithography, offset printing, screen printing, ink jet printing, hand painting or drawing, spraying, stenciling, air brushing, or bonding cutouts of various materials. The materials and processes used to form the pattern 12 will determine its visual and wear characteristics. The following are certain processes which may be used for producing the pattern 12:

—Laser and ink-jet printing: the flexibility of computer layout and design plus computer controlled printing allows custom small quantity runs of intricate patterns and coloring may be closely controlled to a predetermined formula;

—Computer controlled film cutters offer the same automation advantages as laser or ink-jet printers with the added advantage of producing pattern elements which are completely compatible with resins used in the molding of the part;

—Die cutting: large runs of repetitive pattern elements are made by die cutting as a cost efficient production process;

—Lithography: includes cylinder offset, letterpress and flatbed printing; all may be used and may be more economical for longer runs than the laser and ink-jet; brilliant and accurate coloring is possible with near photographic quality reproduction;

—Screen printing: offers a wide variety of print mediums; paints, both water and oil based, provide a wide variety of colors, textures and sheens; acrylic enamels offer the same variety; in moderately abrasive environments, some paints and enamels may have sufficient abrasion resistance to be useful without any protective covering; two-part urethane and epoxy based paints offer a broad range of colors, sheens and textures and have the added advantage of high resistance to abrasion; many applications using these paints would not require additional protective covering; heated screen printing would allow the use of thermoplastic mediums; and —Hand painting with brush, roller or spray offers image flexibility; the use of templates or masks adds to flexibility.

The materials used to construct the pattern background 14 include, but are not limited to: papers (both organic and synthetic), cloth, and plastic films.

Certain combinations of pattern materials, pattern background film materials, and pattern application methods are more practical for some embodiments than for others. The three elements are preferably selected in compatible sets. The primary requirement for certain preferred embodiments is that the pattern background 14 bond with the resin used in the molding of the product, and the bonding compatibility exist when the molding resin is in the molten state. Many papers fill this basic requirement. Papers will perform well with almost any graphic art material and application methods. Paper is especially useful in offset printing. Most papers, however, are not water proof. If these are used where moisture is likely, they must be provided with protective covering. Some synthetic papers are waterproof and have the further advantage of being devoid of grain and layering, both of which add to the strength of the implanted pattern structure. Paper has one disadvantage, however, its thermal expansion characteristics are considerably different from most molding resins. This differential in elongation with temperature results in surface distortion on the finished molded part. This may be minimized by keeping the pattern background 14 very thin (e.g. 10 mils or less) and keeping the overall size of the pattern structure small (e.g. 4 inches square or less).

A preferred pattern background 14, from the standpoint of thermal expansion, is a film made of the same material as the resin to be used in molding the product. For example, if the part is to be rotomolded in low density polyethylene, a pattern background 14 of extruded or cast low density polyethylene will have compatible thermal elongation characteristics. Unless the need for special effects overrides method economics, this method of selecting the material for the pattern background is recommended.

With polyethylene as an exemplary molding resin, the pattern background 14 is primarily of polyethylene. Most inks and paints do not bond well with polyethylene. A pattern placed on polyethylene film with most inks or paints and by most methods is fragile. Further, any color patterns to be formed with the four color process, such as in the offset or ink jet printing processes, are usually applied against a white background, a color that would only coincidentally be found in the molding resin used to mold the desired part. Both of these problems may be solved by encapsulating the pattern 12 between two films, one of which is optically clear and the other pigmented as an opaque white.

Figure 2:
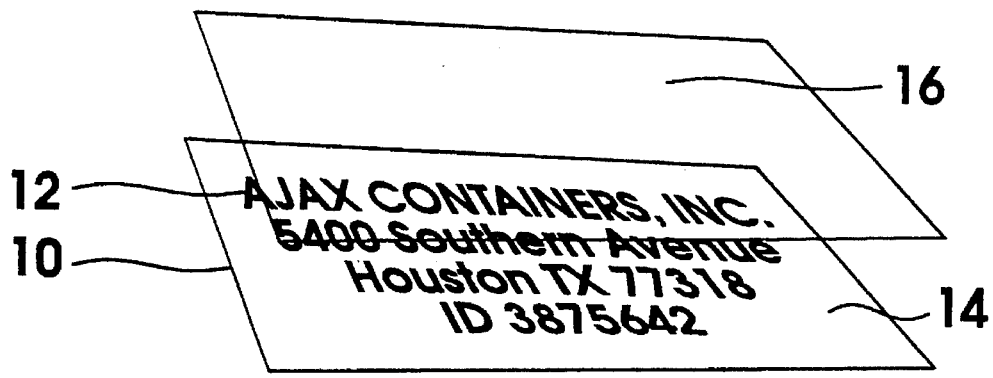
FIG. 2 a schematic perspective view of the pattern structure of FIG. 1 with an additional protective film.

Referring now to FIG. 2, the pattern structure 10 has a pattern 12 formed on a pattern background 74. The pattern background 14 may be natural, opaque white, or colored to match or contrast with the molding resin used in the molding of the desired part. Trimming a colored pattern background 14 in various shapes adds further artistic variations. Another film element 16, one which is preferably optically clear, is bonded over the pattern structure. The clear pattern protective film 16 is a tough covering over the pattern 12 which first protects the pattern 12 while the pattern structure 10 is being stored, handled and applied; then, in a final molded part, protects the pattern 12 from abrasion and environmental hazards. The pattern structure 10 is preferably an assembly of various film elements bonded into one entity. Portions of the pattern structure 10 assembly provide a desired graphic pattern on a finished part. Other portions provide handling and installation advantages and resistance to abrasion in a final product part. A part of the assembly may consist of three dimensional objects embedded in thick clear plastic film. In one aspect the pattern background 14 and the protective film 16 are banded together or fused together to produce an integral unitary pattern structure; e.g. they are heated together so that materials of each flow together upon heating and then fuse together upon cooling.

This bonding of film elements into a final pattern structure 10 may be by laminating with heat and pressure, or through the use of adhesives, or a combination thereof.

Figure 5:
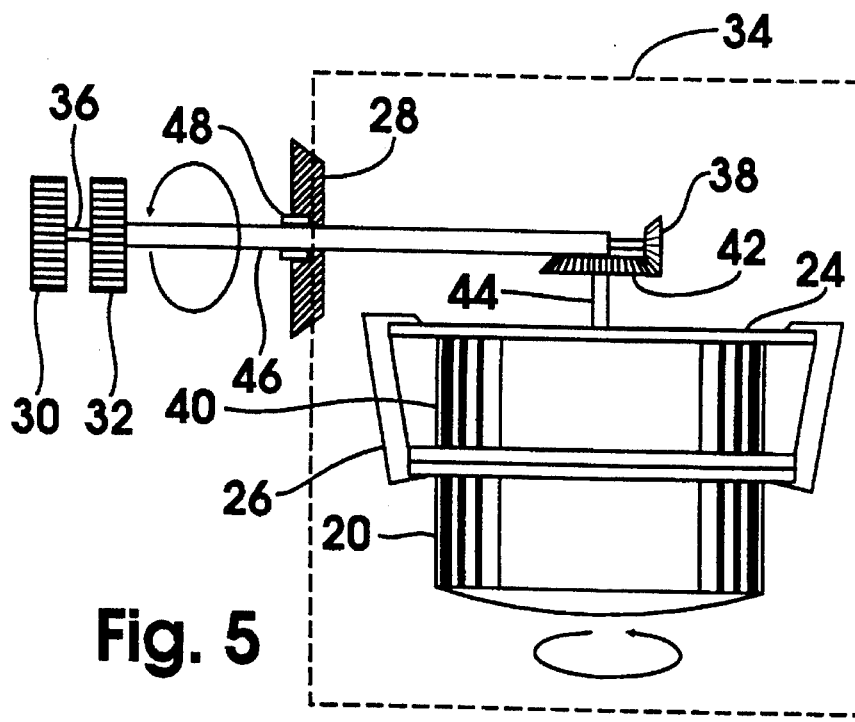
FIG. 5 is a schematic view of a rotational molding system useful with methods according to the present invention.
Figure 3:
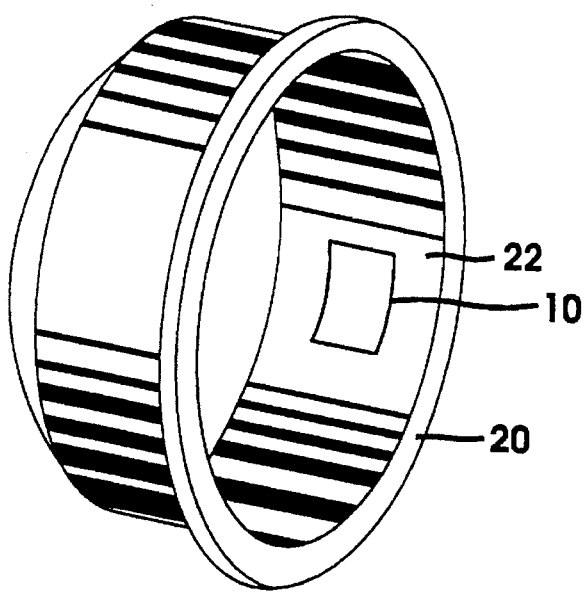
FIG. 3 is a perspective view of a pattern structure as in FIG. 1 emplaced on an inner wall of a mold.

As shown in FIG. 3 in a rotomolding operation the pattern structure 70, (comprising the pattern 12, the pattern background 14, and the optional clear pattern protective film 16, as described above), is placed on a selected location on an inner wall 22 of a mold 20 which is used to rotomold a final product part. As shown in FIG. 5, the mold 20 is one part of a total mold used in cooperation with a second mold 40 to form a hollow cavity mold. The pattern structure 10 remains in location on the inner wall of mold 20 throughout the balance of the rotomolding process. During the rotomolding process: (a) the mold is charged with resin; then (b) heated and tumbled until molten resin coats the entire inner wall of the cavity mold consisting of mold 20 and second mold 40; then (c) cooled until a product part is solidified; then (d) opened and the product part removed. During the heating and tumbling (b) period, the entire pattern structure 70 becomes molten or near molten and joins with the molding resin as an integral part. Since there is motion of the mold 20 during the process, the pattern structure 10 is preferably held in place with an adhesive to avoid shifting in position.

A preferable adhesive used for this purpose preferably meets four requirements: (a) it holds the pattern structure 10 in place during the process; (b) it does not cause the finished part to stick to the mold when the part is removed; (c) it is chemically compatible with the pattern structure 10 and the molding resin used in molding the product part; and (d) it has a gel or paste consistency during the application of the pattern structure 10 to the mold 20 wall so that a bubble-free and air-tight seal may be worked during the application. A simple vegetable oil or cottonseed oil performs this adhesive function when the materials involved are polyethylene. A more suitable gel or paste is made from a micronized version of the appropriate plastic, i.e. polyethylene in the case of a part to be molded of polyethylene.

Figure 4:
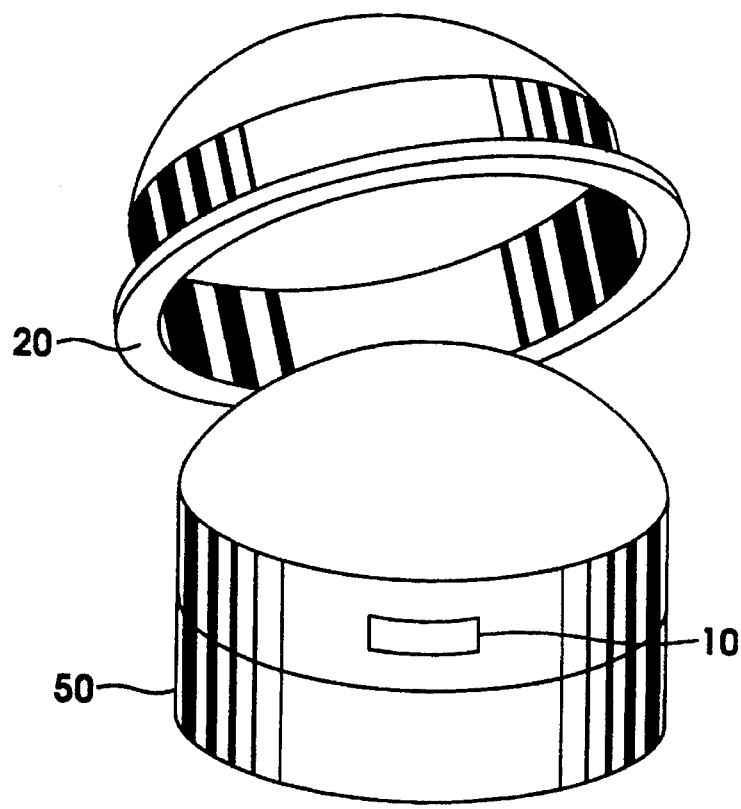
FIG. 4 is a perspective view of a product made with the mold of FIG. 3 according to the present invention.

As shown in FIG. 4 after the mold cycle has been completed, the finished part 50 is removed from the mold 20. The pattern structure 10 is now an integral part of the part 50.

As shown in FIG. 5 (a top view) after the mold 20 has been charged with molding resin and the pattern structure 70 has been applied to the inner wall of the mold 20, the mold 20 is clamped to a molding machine base plate 24 along with the second mold 40 using clamps 26. The base plate 24 moves the mold 20 and second mold 40 and their contents through two axes. A drive gear 30 and second drive gear 32 are on one side of an oven wall 28, whereas the mold 20 and balance of the driving mechanism is within an oven 34 (shown by a dotted line). The driving gear 30 transmits rotating motion through an inner shaft 36 to a driven gear 38 which in turn drives a second driven gear 42 attached to a mold shaft 44, resulting in the rotation of mold 20 around the axis of mold shaft 44. The second driving gear 32 is attached to an outer shaft 46. Outer shaft 46 turns within a bearing 48 in the oven wall 28 and rotates the entire balance of the mechanism to the right of oven wall 28 around the axis of outer shaft 46. This motion is normally an oscillation through about 180 degrees, although this varies widely in commercially available apparatuses.

In one aspect of the present invention a first film (e.g. a decoration, decal or other film made, e.g. of plastic, paper, or synthetic paper) is laminated with a protective polyethylene film over its face, preferably overlapping the edges of the first film to form a composite structure so that it is completely encapsulated. Such complete encapsulation protects the first film from the environment. If the first film is itself made from polyethylene, the area at which the composite structure is disposed in a wall of a final product is strengthened. In certain embodiments a film (e.g. about 0.0005 inches to about 0.003 inches thick) of hot melt glue is applied to the inside of the first film. Heat in the molded part wall melts the hot melt glue sufficiently to bond the graphic structure to the expanded blow molded part.

A blow molding process according to the present invention includes these steps:

Emplacing a composite structure according to the present invention against an inside wall of a two-piece mold cavity of a blow mold apparatus;

Feeding a length of near-molten plastic tube into the mold cavity so that the tube extends through the cavity;

Closing the mold cavity's two pieces together with the composite structure and plastic tube inside the cavity;

Expanding the plastic tube within the mold cavity to move it against the inner walls of the mold cavity and against the composite structure, e.g. by introducing compressed air into the plastic tube, thus forming the final product or part; and Allowing the product or part to cool in the mold cavity and then separating the mold cavity pieces and discharging the final product or part therefrom.

After the mold cavity is originally closed, any excess plastic tube extending beyond the mold cavity may be trimmed or the mold cavity's edges may be formed to cut it off. A typical extruder used in a typical blow mold operation may be used to supply the hot plastic tube to the mold cavity.

In another aspect of the present invention items such as the pattern structure of FIG. 1 or the composite structure described above serve as signs. One or more clear film protective overlays (as in FIG. 2) are used, ranging in thickness from about 0.002 to about 0.1 inches thick. In one aspect such a sign (e.g. a street sign or a stop sign) is adhered to a metal backing plate by a method according to the present invention. One such method includes:

—Preparation of a film graphic or pattern structure, preferably one according to the present invention;

—Laminating the graphic to a thick polyethylene film (e.g. about 0.1 to about 0.3 inches thick) using heat and pressure, then bonding the assembly to a metal backing plate using heat, hot melt glue, and pressure;

—Perforating the metal backing plate with a pattern of holes, laying the graphic composite face down on a flat mold, applying a layer of particulate resin (e.g. about 0.1 to about 0.4 inches thick) over the composite, laying the perforated metal backing plate on the particulate resin, covering the plate with another layer of resin (e.g. about 0.1 to about 0.2 inches thick), then placing the mold and its contents in an oven and baking for about fifteen minutes at about 450 degrees F.

One embodiment of a method for making a pattern structure according to the present invention includes these steps:

—Making a gel from micronized plastic and cottonseed oil, preferably with about 50% of each by weight and preferably firm and viscous enough to barely hold a peak (a "peak" is a mound formed at room temperature)

—Oiling an aluminum flat panel with cottonseed oil;

—Placing a clear polyethylene film, low density, about 0.005 to about 0.006 inches thick, on the panel and squeegeeing all air from between the film and the panel and wiping off excess oil; and —Baking the panel in an oven at 400 degree F. for about 4 minutes.

In one aspect an ink is made by stirring pigment into the gel. Cottonseed oil is used for thinning if necessary, or micronized plastic for thickening; in one preferred embodiment the ink is about 50% pigment by weight. In one screenprinting process of such a panel, a first color is screenprinted onto the panel and then it is baked at 400 degrees F. for about 4 minutes. For more than one color, this process is repeated for each color. For final preparation of the panel an oil (e.g. cottonseed oil) film is applied over the screenprinted area and smoothed over the entire surface, e.g. with a squeegee. Excess oil is wiped off of the surface. Larger graphics' (e.g. 8 inches by 8 inches or larger) strength is increased by adding a layer of molding plastic, e.g. a layer preferably not more than one-eighth inch final plastic thickness added and typically about 0.05 inches of thickness for each inch of dimension in excess of 8 inches. Preferably molding granules where an outline is to be cut are brushed away; then the panel is placed in a preheated oven at 400 degrees F. for about 4 to 5 minutes. The panel is then cooled to room temperature. The film is stripped from the panel and placed on a flat-bed cutter and indexed for position. Patterns, if any and if desired, are cut from the panel, preferably leaving a border (preferably between about three-sixteenths inch to about one quarter inch) around each pattern.

In another embodiment of the present invention a pattern structure is made as previously described with printing laminated between two sheets of polyethylene. In one embodiment such a pattern structure includes one clear sheet and one (lower) colored sheet. In one embodiment the two sheets are a desired size so that they form a bag or may be formed into a bag. In one embodiment each layer is about two thousandths of an inch thick.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A method for molding a plastic part in a mold having a mold cavity, the mold cavity having an interior surface, the plastic part made from a specific plastic material, the method comprising forming a pattern structure by applying indicia to a first layer made from the specific plastic material and then applying a clear second layer made from the specific plastic material over the indicia and over the first layer, and then bonding the first layer to the second layer, applying the pattern structure to the interior surface of the mold cavity, charging the mold cavity with an amount of the specific plastic material, heating the pattern structure and the amount of specific plastic material in the mold cavity and disbursing the amount of specific plastic material therein to render the amount of specific plastic material molten to form a shape of the plastic part, allowing the part to cool, removing the part from the mold cavity with the pattern structure therein as an integral part thereof, applying adhesive to a portion of the interior of the mold cavity onto which the pattern structure is applied to hold the pattern structure in place, and the adhesive comprising a mixture of vegetable oil and micronized plastic pellets ranging in size between about 10 microns to about 100 microns.

2. The method of claim 1 wherein about one part by volume micronized plastic pellets are mixed with about four parts by volume vegetable oil.

3. The method of claim 1 wherein the micronized plastic pellets are made from polyethylene.

4. A method for molding a plastic part in a mold having a mold cavity, the mold cavity having an interior surface, the plastic part made from a specific plastic material, the method comprising forming a pattern structure by applying indicia made from polyethylene to a first layer made from polyethylene and then applying a clear second layer made from polyethylene over the indicia and over the first layer, and then bonding the first layer to the second layer, applying the pattern structure to the interior surface of the mold cavity, charging the mold cavity with an amount of the polyethylene, heating the pattern structure and the amount of polyethylene in the mold cavity and disbursing the amount of polyethylene therein to render the amount of polyethylene molten to form a shape of the plastic part, allowing the part to cool, and removing the part from the mold cavity with the pattern structure therein as an integral part thereof, first layer ranging in thickness between about 0.002 inches and about 0.010 inches and the second layer ranging in thickness between about 0.002 inches and about 0.010 inches, the heating causing the first layer and the second layer to flow and fuse with a portion of the amount of polyethylene charged in to the mold cavity, applying adhesive to a portion of the interior of the mold cavity onto which the pattern structure is applied to hold the pattern structure in place, the adhesive comprising a mixture of vegetable oil and micronized plastic pellets ranging in size between about 10 microns to about 100 microns, and wherein about one part by volume micronized plastic pellets are mixed with about four parts by volume vegetable oil, and wherein the micronized plastic pellets are made from polyethylene.

* * * * *